May 15, 1962 C. F. SCHAEFER ET AL 3,034,191
ISOSTATIC MOLDING APPARATUS
Filed Oct. 5, 1960

INVENTORS
Carl F. Schaefer &
BY John Z. Stoia
S. C. Thorpe
ATTORNEY

United States Patent Office 3,034,191
Patented May 15, 1962

3,034,191
ISOSTATIC MOLDING APPARATUS
Carl F. Schaefer, Flint, and John Z. Stoia, Grand Blanc, Mich., assignors to General Motors Corporation, Detroit, Mich., a corporation of Delaware
Filed Oct. 5, 1960, Ser. No. 60,744
6 Claims. (Cl. 25—45)

This invention relates to molding and particularly to an improved press for molding granular or powdery materials by compaction.

In the manufacture of ceramic parts such as spark plug insulators and the like, as well as in the manufacture of powdered metal parts of various kinds, loose material in granular or powdery form is initially compacted into a substantially rigid mass generally having an outer contour approximately conforming to the configuration to the final product. The outer contour is then machined to the desired shape, after which the compacted body is fired to effect its final hardness and other properties. In compacting the granular or powdery material, the so-called "isostatic" molding process has long been used, wherein a mold of solid material such as soft rubber is employed, the walls of which are normally self-sustaining but have the characteristic of flowability as a liquid when subjected to pressure. In this molding process, a rigid retainer is provided which surrounds the mold and after the latter has been filled with the moldable material, liquid or gaseous fluid under high pressure is introduced between the adjacent walls of the mold and retainer to shape the granular or powdery material into its desired form by compaction. In the use of the process for manufacturing hollow articles, the mold is conventionally made with openings extending through the walls thereof opposite the respective ends of the cavity to be formed in the finished part, and during compaction of the moldable material each of these openings is closed by a steel or other rigid plug which provides surfaces against which the ends of the blank are formed and, at the same time, hold the mold in alignment with the core pin so that the resulting cavity will be properly located within the compacted body. While desired centering of the cavity can thus be obtained, a disadvantage results in that true isostatic pressure cannot be applied to the moldable material immediately adjacent the steel plugs, apparently because the mold tends to seize on the circumferential surface of the plug, restricting its flowability in this area and resulting in less compaction and lower density of the material in this section. Such sections of the molded part having less than the desired density are particularly susceptible to mechanical damages and are not apt to develop the desired properties during the subsequent firing operation.

The aforementioned problem has been particularly troublesome in maintaining high quality in the manufacture of spark plug insulators, since such parts must be formed with a central cavity to receive the center electrode of the spark plug and it is important that uniform hardness and strength of the insulator be maintained at the firing tip end. Any cracks or flaws in this area tend to subject the spark plug to malfunctioning.

It is the principal object of our invention to provide an improved press for molding granular or powdery material into a substantially rigid body having an internal cavity, which eliminates the aforementioned defects in apparatus heretofore used for the purpose, and which is particularly applicable for use in manufacturing ceramic insulators for spark plugs. Broadly, the improvements are effected through the elimination of one of the closure plugs and the opening therefor in the mold, and by the substitution of other means for locating this section of the mold so as to maintain the desired alignment of the cavity within the compacted body.

The means by which this and other objects and advantages of the invention are attained will be readily understood from the following description of a preferred embodiment selected for purposes of illustration, having reference to the drawing, wherein.

Figure 4:
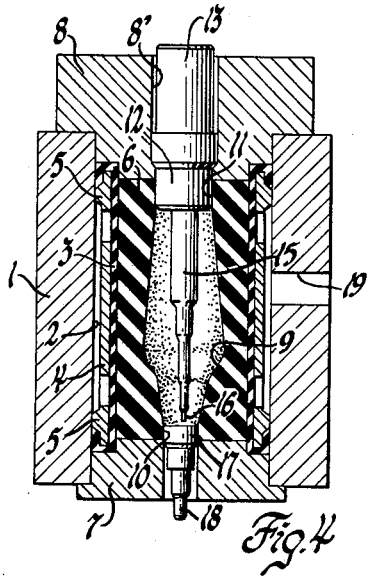
FIGURE 4 is a view similar to FIGURE 1, showing the prior art construction of such a press.

The prior art press of FIGURE 4 comprises a mold retainer 1 in the form of a steel block having a cylindrical bore 2. Within the bore is a rubber sleeve 3. This is supported therein by a perforated steel sleeve 4 whose ends are sealingly overlapped by the ends of the rubber sleeve 3 and whose outer extremities 5 adjacent each end closely fit the bore 2. Surrounded by the rubber sleeve 3 is a mold 6 which is retained in place at its opposite ends by a retainer bottom wall 7 and a top wall 8. This top wall has an inlet 8' through which the press is charged with the material to be molded. These bottom and top walls 7 and 8 when fastened securely to the side walls of the retainer provide a rigid enclosure for the mold 6. The mold 6 is made of solid material such as soft rubber which is normally self-sustaining but which is flowable under applied pressure. It is made hollow with internal wall surfaces 9 shaped similarly but slightly larger than the outer configuration of the ceramic body to be formed therein. The mold has openings 10 and 11 at its opposite ends, the upper end opening 11 being closable by a plug member 12 forming the lower end of a movable die 13. Extendible into the mold with the die 13, and suitably supported by the latter against movement transversely of the mold, is a rigid core 15. The lower or extended end 16 of this core terminates within the mold in slightly spaced relation from a plug member 17 which closes the lower opening 10 of the mold, this lower plug being suitably supported rigidly with the retainer by a rod 18 and other structure (not shown). Upon raising the movable die 13, the moldable material can be inserted into the mold through the retainer inlet 8' and upper opening 11 and then confined therein by relowering this die until the plug 12 and the core 15 return to their positions shown. Then by introducing fluid under high pressure into the retainer via the passageway 19 the rubber sleeve 3 is constricted, which, in turn, transmits pressure against the sides of the mold 6. The flowability of the material of this mold causes it to exert substantially uniform pressure against the powder contained therein throughout the length of the core 15, except in the sections immediately adjacent the upper and lower plugs 12 and 17. In these sections, the flowability of the rubber mold is apparently somewhat restricted by frictional seizure with the circumferential faces of the plugs. Also, flashing of the compacted body tends to occur at the juncture of these plugs with the mold. Experience has shown that when the fluid pressure is relieved and the compacted body is removed from the mold, this flash crumbles away, allowing cracks or other flaws to originate in the resulting jagged edges.

As pointed out above, such defects in the initial compacting of the body or blank is particularly serious at the tip end of such blanks used in manufacturing spark plug insulators. Such tip end, as illustrated in FIGURE 4, is that adjacent the extended end 16 of the core and the lower plug 17.

Figure 1:
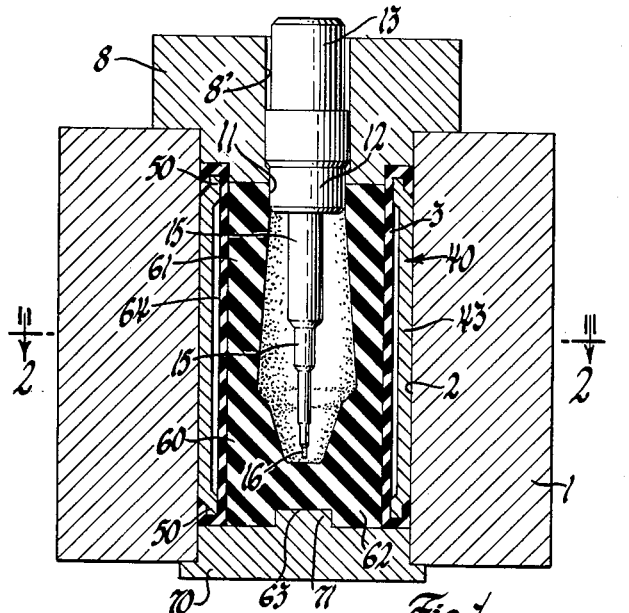
FIGURE 1 is a longitudinal sectional view of the improved press, showing the central cavity-forming core in position therein preparatory to applying pressure to the material to be molded thereagainst by compaction, the view being taken substantially along the line 1—1 of FIGURE 2.
Figure 2:
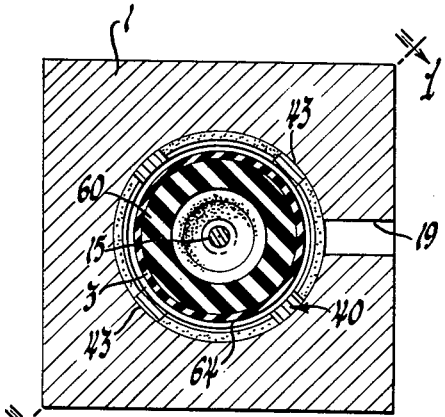
FIGURE 2 is a transverse sectional view taken substantially along the line 2—2 of FIGURE 1.
Figure 3:
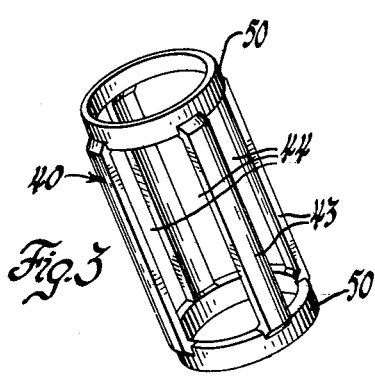
FIGURE 3 is a perspective view of the perforated sleeve shown removed from the press.

Referring now to the improved press shown in FIGURES 1–3, a mold 60 is provided having integral side and bottom walls 61 and 62, wherein the lower plug 17 and opening 10 therefor of the prior art construction has been eliminated. With such a mold, the bottom wall 62 which operates to form the tip end of the blank is made subject to essentially uniform pressure and thus acts to produce compaction of the material adjacent the extended end 16 of the core of the same density as in the remainder of the blank. For maintaining the proper concentricity of the blank adjacent this tip end, the bottom wall 62 of the mold is provided with a central recess 63, and the bottom wall 70 of the retainer is constructed with a corresponding projection 71 which closely fits this recess.

In FIGURES 1–3 there is also shown an improved construction of the perforated steel sleeve. This sleeve 40 is similar to that shown at 4 in the prior construction of FIGURE 4, but differs importantly in having its opposite end portions 50 of reduced diameter relative to the perforated intermediate portion 43 of the sleeve which is made to closely fit the bore 2 of the retainer 1. The advantage of this improved perforated sleeve 40 lies in the fact that the oil or other pressure fluid introduced into the retainer by the passage 19 and the perforations 44 in the sleeve 40 has freedom to flow throughout the lateral external surface 64 of the rubber sleeve 3, thus eliminating any tendency of the rubber sleeve 3 to adhere to the surrounding surfaces of the perforated metal sleeve as would tend to interfere with desired centering of the compacted blank about the axis of the core 15. The top wall 8, upper die 13 and upper plug 12 are unchanged from the correspondingly numbered parts of the prior art construction of FIGURE 4 previously described.

While only a single preferred embodiment of the invention has been disclosed, it is appreciated that numerous minor changes in the construction and arrangement of the parts may be made without departing from the spirit and scope of the invention as defined in the following claims.

We claim:

1. In a press for molding granular or powdery material into a substantially rigid body with an internal cavity extending thereinto, a mold retainer having an inlet, a hollow mold within the retainer having a single opening opposite the retainer inlet, the mold being of solid material that is normally self-sustaining but which is flowable under pressure, a rigid core extendible into the mold through said opening therein and the inlet of the retainer, said core terminating at its extended end within the mold to define said body cavity, means interconnecting the mold and retainer opposite the extended end of the core against relative movement laterally of the core, means supporting the core and operable to close the retainer inlet and said mold opening after the mold has been filled with the moldable material, and means for applying fluid under pressure between the retainer and the mold to effect compression of the moldable material about the core.

2. In apparatus for molding granular or powdery material into a substantially rigid body with an internal cavity extending thereinto, a hollow mold having a single opening to the exterior, the mold being of solid material that is normally self-sustaining but which is flowable under applied pressure, a rigid core extendible into the mold through said opening, said core terminating at its extended end within the mold to define said body cavity, a member supporting said core at its opposite end and operable to close said mold opening after the mold has been filled with the moldable material, means rigid with said member and anchoring said mold opposite the extended end of the core against movement transversely of the core, and means for applying fluid under pressure to the exterior of the mold between said means and member to effect compression of the moldable material about the core.

3. In a press for molding granular or powdery material into a substantially rigid body with an internal cavity extending thereinto, a hollow mold having imperforate side and bottom walls and a filler opening opposite said bottom wall, said mold being of material that is normally self-sustaining but which is flowable under applied pressure, a rigid core extendible through said opening into the mold, said core terminating at its lower end above said bottom wall, support means for said mold and core including a retainer having rigid side and bottom walls enclosing said mold side and bottom walls, a top wall engageable with the retainer side walls for confining the mold adjacent said opening, and a member in said top wall supporting the upper end of the core and movable to close the mold opening after the mold has been filled with the moldable material, said bottom walls of the mold and retainer having portions interconnected opposite the extended end of the core to prevent lateral movement of the mold bottom wall in the retainer, and means for applying fluid under pressure between the mold and the retainer to compress the moldable material about the core.

4. The invention of claim 3, wherein said last named means includes a fluid impervious flexible sleeve embracing the mold side walls, the ends of said flexible sleeve being in sealed engagement with the retainer side walls, and passage means for introducing fluid under pressure into the retainer externally of the flexible sleeve and between the ends thereof.

5. The invention of claim 4, wherein said passage means includes a perforated metal sleeve intermediate the flexible sleeve and the retainer side walls, said metal sleeve having reduced diameter end portions spacing the portion of said metal sleeve intermediate its said end portions from the flexible sleeve.

6. In a press for compacting granular or powdery ceramic material into a pre-form of a spark plug insulator having a passage extending therethrough for locating the spark plug center electrode, the pre-form having said passage terminating therein adjacent the firing end of the spark plug, said press comprising a mold of generally cup-shape having integral side and bottom walls and open at its upper end to receive the moldable ceramic material, said mold being of solid material that is normally self-sustaining but flowable under applied pressure, said mold bottom wall having a central recess extending thereinto from its external surface, a rigid core extendible into the mold through said upper end, die means supporting the core at its end adjacent the upper end of the mold and having a plug member extendible into said mold upper end to close the same after the mold has been filled with the moldable ceramic material, said core terminating at its extended end in spaced relation from the mold bottom wall when said plug member is in its extended position closing said mold upper end, a rigid retainer for said mold, said retainer being generally cup-shape with side and bottom walls enclosing said mold side and bottom walls, said retainer side walls defining an annular space surrounding the mold side walls, said retainer bottom wall having an upstanding projection engaging said mold recess, a top wall engageable with said retainer side walls and the upper end of the mold, a rubber sleeve embracing the mold side walls, a perforated rigid sleeve spacing the rubber sleeve from the retainer side walls, said rubber sleeve having its ends sealingly engaging the ends of the perforated sleeve and the retainer side walls adjacent the retainer bottom wall and said top wall, and passage means in the retainer for conducting fluid under pressure to the external surface of the perforated sleeve.

References Cited in the file of this patent

UNITED STATES PATENTS

| | | |
|---|---|---|
| 2,152,738 | Jeffery | Apr. 4, 1939 |
| 2,558,823 | Crowley et al. | July 3, 1951 |